United States Patent
Adam et al.

(10) Patent No.: US 10,878,234 B1
(45) Date of Patent: Dec. 29, 2020

(54) AUTOMATED FORM UNDERSTANDING VIA LAYOUT AGNOSTIC IDENTIFICATION OF KEYS AND CORRESPONDING VALUES

(71) Applicant: Amazon Technologies, Inc., Seattle, WA (US)

(72) Inventors: Amit Adam, Haifa (IL); Oron Anschel, Haifa (IL); Hadar Averbuch Elor, Ra'anana (IL); Shai Mazor, Binyamina (IL); Gal Sabina Star, Haifa (IL); Or Perel, Tel Aviv (IL); Wendy Tse, Seattle, WA (US); Andrea Olgiati, Gilroy, CA (US); Rahul Bhotika, Bellevue, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 16/196,499

(22) Filed: Nov. 20, 2018

(51) Int. Cl.
*G06K 9/62* (2006.01)
*G06K 9/00* (2006.01)
(Continued)

(52) U.S. Cl.
CPC ..... *G06K 9/00449* (2013.01); *G06F 16/9024* (2019.01); *G06K 9/00463* (2013.01);
(Continued)

(58) Field of Classification Search
CPC ........... G06K 9/00449; G06K 9/00463; G06K 9/00469; G06K 9/469; G06K 9/6215;
(Continued)

(56) References Cited

U.S. PATENT DOCUMENTS

2012/0005238 A1\* 1/2012 Jebara ................... G06Q 30/02
707/798
2016/0342709 A1\* 11/2016 Fokoue-Nkoutche ......................
G06F 16/9024
(Continued)

OTHER PUBLICATIONS

Suri, Subhash; Bipartite Matching & the Hungarian Method; revised Aug. 30, 2006; downloaded from the Internet on Nov. 20, 2018; https://www.cse.ust.hk/~golin/COMP572/Notes/Matching.pdf; 21 pages.
(Continued)

*Primary Examiner* — Xin Jia
(74) *Attorney, Agent, or Firm* — Nicholson De Vos Webster & Elliott, LLP

(57) ABSTRACT

Techniques for automated form understanding via layout-agnostic identification of keys and corresponding values are described. An embedding generator creates embeddings of pixels from an image including a representation of a form. The generated embeddings are similar for pixels within a same key-value unit, and far apart for pixels not in a same key-value unit. A weighted bipartite graph is constructed including a first set of nodes corresponding to keys of the form and a second set of nodes corresponding to values of the form. Weights for the edges are determined based on an analysis of distances between ones of the embeddings. The graph is partitioned according to a scheme to identify pairings between the first set of nodes and the second set of nodes that produces a minimum overall edge weight. The pairings indicate keys and values that are associated within the form.

21 Claims, 8 Drawing Sheets

(51) Int. Cl.
*G06K 9/46* (2006.01)
*G06T 7/70* (2017.01)
*G06F 16/901* (2019.01)
*H04L 29/08* (2006.01)

(52) U.S. Cl.
CPC ......... *G06K 9/00469* (2013.01); *G06K 9/469* (2013.01); *G06K 9/6215* (2013.01); *G06K 9/6261* (2013.01); *G06T 7/70* (2017.01); *G06K 2209/01* (2013.01); *G06T 2207/20072* (2013.01); *G06T 2207/20081* (2013.01); *G06T 2207/20084* (2013.01); *G06T 2207/30176* (2013.01); *H04L 67/10* (2013.01)

(58) Field of Classification Search
CPC .... G06K 9/6261; G06K 2209/01; G06T 7/70; G06T 2207/20072; G06T 2207/20081; G06T 2207/20084; G06T 2207/30176; G06F 16/9024; H04L 67/10
See application file for complete search history.

(56) References Cited

U.S. PATENT DOCUMENTS

| 2019/0171875 | A1* | 6/2019 | Northrup | G06F 40/109 |
| 2019/0303662 | A1* | 10/2019 | Madhani | G06K 9/6202 |
| 2020/0151444 | A1* | 5/2020 | Price | G06N 7/005 |

OTHER PUBLICATIONS

Fathi, Alireza, et al.; Semantic Instance Segmentation via Deep Metric Learning; Mar. 30, 2017; 9 pages.
De Brabandere, Bert, et al.; Semantic Instance Segmentation with a Discriminative Loss Function; Aug. 8, 2017; 10 pages.

* cited by examiner $$\mathcal{L}_e = -\frac{1}{|S|} \sum_{p,q \in S} w_{pq} \left[ 1_{\{y_p = y_q\}} \log(\sigma(p,q)) + 1_{\{y_p \neq y_q\}} \log(1 - \sigma(p,q)) \right]$$

FIG. 3

AUTOMATED FORM UNDERSTANDING VIA LAYOUT AGNOSTIC IDENTIFICATION OF KEYS AND CORRESPONDING VALUES

BACKGROUND

The automated processing and understanding of the content within forms is a difficult problem with a strong-felt need for a solution. Although solutions do exist for forms with fixed, rigidly-defined layouts (because it is trivial to write logic to identify known values in known locations), the automated handling of forms that have flexible or unknown layouts is not a solved problem.

BRIEF DESCRIPTION OF DRAWINGS

Various embodiments in accordance with the present disclosure will be described with reference to the drawings, in which:

FIG. 3 is a diagram illustrating an exemplary loss function useful for training one or more machine learning models of an embedding generator according to some embodiments.

DETAILED DESCRIPTION

Figure 1:
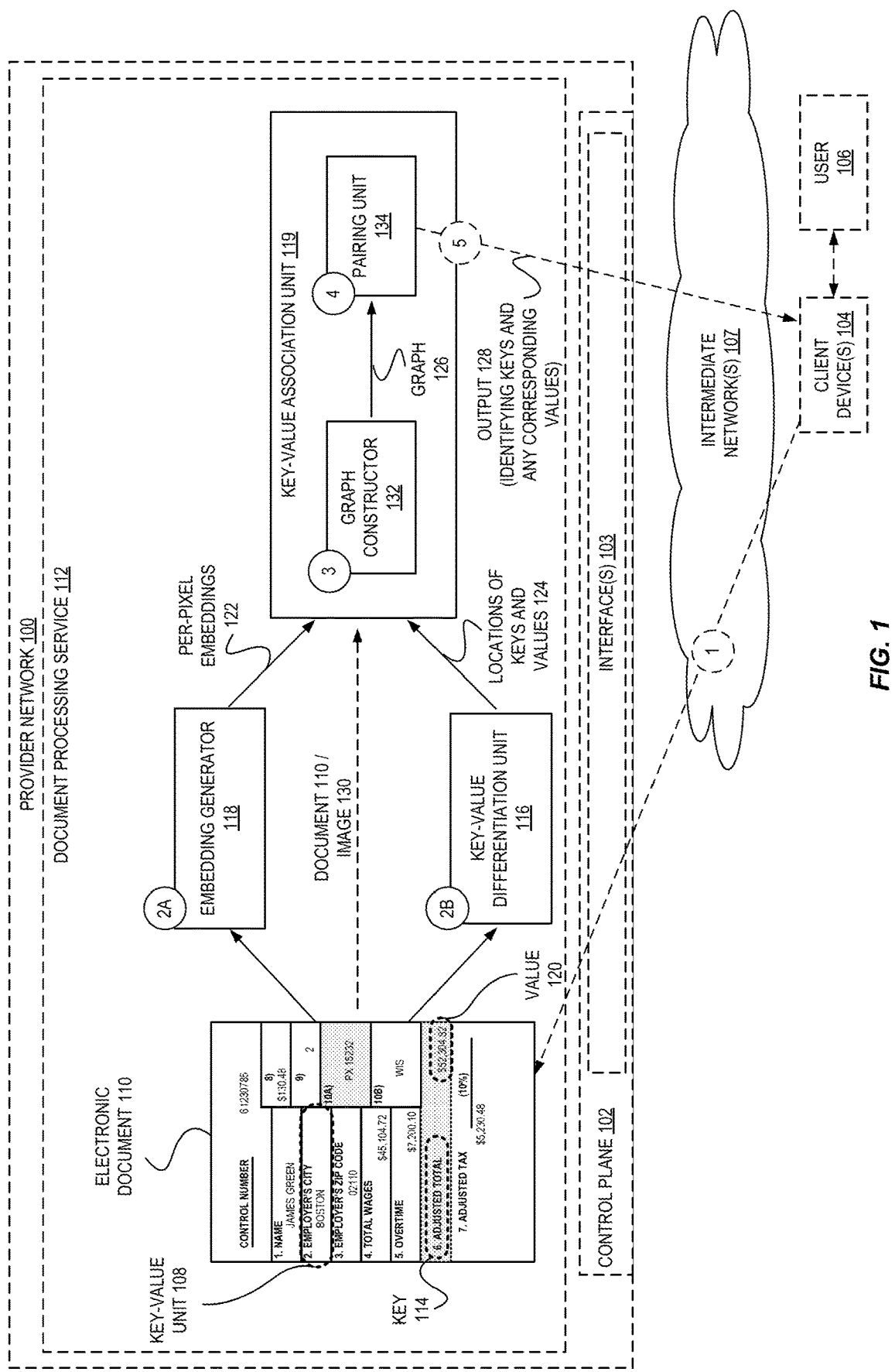
FIG. 1 is a diagram illustrating an environment for automated form understanding via layout-agnostic identification of keys and corresponding values according to some embodiments.

Various embodiments of methods, apparatus, systems, and non-transitory computer-readable storage media for automated form understanding via layout-agnostic identification of keys and corresponding values are described. According to some embodiments, a key-value association unit can automatically identify which "keys" and which "values" detected in an electronic document correspond to one another. The key-value association unit utilizes per-pixel embeddings generated for pixels from an image (representing the document) using a machine learning model that was trained to cause embeddings for pixels in a same "key-value unit" to be similar to each other but significantly separated from embeddings generated from pixels in other key-value units of the image. The key-value association unit can generate a graph including nodes for the keys and values, and assign weights to edges between ones of the nodes based on ones of the per-pixel embeddings, where "larger" weights will indicate a lower likelihood that a joined key and value in the graph are part of a same key-value unit, and "smaller" weights will indicate a higher likelihood that a joined key and value in the graph are part of a same key-value unit. Accordingly, the key-value association unit can identify pairings of keys and values based on the weights of the edges in the graph according to an automated graph partitioning algorithm, to thus programmatically determine which keys from a document correspond to which values, even when the key-value association unit has no advance knowledge of the layout of the particular document.

Recently, techniques from the field of machine learning (ML) are being adapted in a variety of fields for a variety of purposes. For example, using ML to analyze images to detect the existence and locations of objects is one such application. Another possible application could include analyzing images (that carry a representation of a document such as a form) to identify what text is within the document, the structure of text within the document, and/or relationships between text within the document. For example, to implement a document processing service, numerous types of ML models may be utilized to analyze digital documents seeking to, for example, identify where text is represented within an image representation of a document and identify what that text is.

However, performing such operations on images carrying a representation of a form—especially when a ML model has not been trained to "understand" a particular form having a particular form layout—remains a difficult task. For example, identifying the various components in a form document is problematic. In some cases, a form schema that contains the various form "keys" (e.g., "first name", "last name", "address", etc.) is available, but the actual form layout may vary across different forms. In other cases, a form schema may not even exist. Although some optical character recognition (OCR) tools can successfully identify some of the words contained in documents, identifying and classifying these words in the context of forms is not trivial due to various noises and nuisances (e.g., avoiding explanatory text such as instructions for filling out a form), including outlier detections and ambiguity in classification (for example, the word "name" may appear multiple times).

For example, with regard to governmental documents (e.g., W2s), there may be tens or hundreds of millions of people that fill out a same or similar form. Thus, it would be advantageous to find a way to automatically extract that data.

Prior systems attempt to extract entered form data by, for example, obtaining an image of a form (e.g., scanning a form) and trying to analyze it based on some defined layout (or "template") that is defined in advance. Thus, using knowledge of where a particular field is, the system can look in that defined place to find the value—e.g., look in a box at a particular coordinate within a document for a "name" However, when the layout of the form changes, the system breaks until someone can configure the system with the details of the "new layout" to thereafter be able to process that form—for example, people have to update mappings, and the system needs to know which one of the mappings needs to be used. This problem is further complicated in that there can be dozens of different layouts for a same form, new forms can be introduced all the time, etc., and thus this approach doesn't scale.

However, embodiments provide an automated layout-free system that can determine which text in a document (or form) may be keys, which text may be the values, and which of the keys and values correspond to one another—e.g., that a value of "129 West 50th Street" is to be associated with a key of "Street" and not associated with a key of "First Name," even when the key of "First Name" potentially may be laid out in the form much closer to the value than the correct key of "Street." Thus, embodiments no longer necessarily need to have explicit knowledge of the layout of the form in advance and can instead intelligently analyze the form to detect where the keys and values are located, and which keys and values are associated without using some template-matching approach.

Accordingly, as introduced above, embodiments disclosed herein provide a system for automatically associating detected words in an electronic representation of a document (e.g., a form, or including form-type elements)—e.g., a "form key" (or "attribute") as being associated with a "form value" (e.g., a value pertaining to a corresponding form key—a form value of "Green" may be associated with a form key of "color," and a form value of "January" may be associated with a form key of "month", etc.) The association allows for further analysis of the form and a richer understanding of the detected content.

Embodiments described herein leverage an insight that there does exist an accepted "universal style" for forms. For example, if a person is given a new form to complete, and the form is written in a language that the person cannot read—for example, Arabic or Hebrew or Khmer—most people will still be able to easily understand where are the places in the form where a person is expected to provide an answer—i.e., where are the fillable areas where a "value" to be added. Similarly, for each filled "value," individuals will easily be able to localize the question it answers—in other words, identify what the "key" is that is associated with a particular value. This phenomenon exists despite the fact that a person may be unable to read a form because there are universal styles/conventions related forms—for example, nearly all areas around the globe make use of user interface elements such as checkboxes, a question with an empty line providing a space for the associated answer, a row of adjacent boxes in which a person is to fill in alphanumeric digits (e.g., a phone number, ZIP code, first name, etc.) As this set of conventions is limited, embodiments can "learn" to identify these basic units of visual styles for forms, and then use this learned knowledge to understand new forms (in which the layout is not known in advance). For example, embodiments are able to segment the different key-value units of the form, distinguish between key regions and value regions, and associate between values and their corresponding keys. A "key-value unit" is a region (for example, a rectangle or other polygon) of an image (of a form or form portion) that includes both the key (e.g., the question a portion of the form is asking, such as "Social Security Number:") and the area where the answer (or "value") is to be filled. Embodiments can create a training set of forms where such key-value units have been annotated, and use a machine learning model (e.g., neural network(s)) to learn to predict whether a pair of two pixels are in a same key-value unit or different key-value unit. The ML model generate a per-pixel embedding, and the ultimate decision can be based on the distance between the embedding vectors of the two pixels from the pair. Once the ML model is trained, embodiments use it to match between corresponding keys and values, which may be obtained beforehand (e.g., by a key value differentiation-unit) or afterward (e.g., using an optical character recognition (OCR) engine to analyze the key and value boxes), thus enabling the system to "read" the form automatically via knowledge of matching keys and values. Moreover, some embodiments using this approach are able to bypass the need to "read" all the text on the form, which oftentimes contains a lot of irrelevant content such as filling instructions, form version indicators, legal notices, and so on.

FIG. 1 is a diagram illustrating an environment for automated form understanding via layout-agnostic identification of keys and corresponding values according to some embodiments. In this example environment, the key-value association unit 119 may be implemented as a component of a document processing service 112, which may be implemented using software executed by one or multiple computing devices, and in various embodiments could be implemented in hardware or a combination of both hardware and software. For example, in some embodiments, such as when the key-value association unit 119 is implemented as a component or part of a service (e.g., document processing service 112) within a provider network 100 and needs to operate in large scale to process substantial numbers of requests, the key-value association unit 119 (and/or document processing service 112) may be implemented in a distributed manner—e.g., using software executed by multiple computing devices in a same or different geographic location(s).

A provider network 100 provides users (e.g., user 106) with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users 106 (or "customers") of provider networks 100 may utilize one or more user accounts that are associated with a customer account, though these terms may be used somewhat interchangeably depending upon the context of use. Users 106 may, via a client device 104 such as a personal computer (PC), laptop, mobile device, smart device, etc., interact with a provider network 100 across one or more intermediate networks 107 (e.g., the internet) via one or more interface(s) 103, such as through use of application programming interface (API) calls, via a console implemented as a website or application, etc. The interface(s) 103 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, the document processing service 112 in some embodiments is implemented via software, and includes a number of sub-components that may also be implemented in whole or in part using software, such as a key-value differentiation unit 116, the key-value association unit 119, an embedding generator 118, etc. The document processing service 112 may perform various functions upon data (e.g., images) carrying or providing representations of documents. For example, the document processing service 112 may identify text represented within an image and process the text in intelligent ways, e.g., based on where the text is located within the representation.

As used herein, the term "text" is typically used to refer to alphanumeric data—e.g., alphabetic and/or numeric characters, which may include Latin letters, Arabic digits, punctuation marks, symbols, characters from other character sets, etc. As one example, "text" may include Unicode characters (e.g., currently 137,439 characters covering 146 modern and historic scripts, as well as multiple symbol sets and emoji). Thus, the term "text" is to be understood broadly and is not meant to be limited to only "letters" unless otherwise indicated by the context of use.

As shown by optional circle (1), an electronic document 110 may be provided in some manner. For example, a client device 104 of a user 106 may upload the electronic document 110 to a document processing service 112, to a storage service of a provider network 100, or to another location. Further detail regarding some additional options for the origination of the electronic document 110 will be provided later herein with regard to FIG. 2.

In this example, the electronic document 110 includes a representation of a form with multiple key-value units. One example key-value unit 108 is shown and as a rectangular region including a key of "2. EMPLOYER'S CITY" with a corresponding value of "BOSTON." In some scenarios a key-value unit may comprise a rectangle or square area from the electronic document 110, though in other embodiments the key-value unit may be of a different shape, e.g., some other type of polygon that delineates a region including a key and a value. Thus, the electronic document 110 includes one or multiple key-value units 108, one or multiple corresponding keys 114, and one or more values 120—notably, it is not always the case that a key 114 will have a corresponding value 120.

In some embodiments, the electronic document 110 (or a derivation therefrom, such as an image file corresponding to a visual representation of another format of electronic document 110) is provided at circle (2A) to an embedding generator 118 that generates a set of per-pixel embeddings 122. The embedding generator 118 in some embodiments comprises a machine learning (ML) model, such as a neural network, that was trained utilizing a loss function that separates the embeddings it generates for pixels in different key-value units (that is, places them far apart according to a distance measure in an n-dimensional space) and places the embeddings it generates for pixels in the same key-value unit close together.

As one example, the ML model may comprise a neural network that uses three parallel lines of two convolutional blocks each. The three parallel lines employ three sizes of convolution kernels (e.g., small, medium, and large). All six feature sets may be collected (e.g., three resolutions and two convolutional blocks) and reduced to the embedding dimension by 1*1 convolutions. In this example, the loss function used for training this network may sample pairs of pixels and try to correctly predict whether they belong to the same key-value unit or not. For example, the distance between the embedding vectors may be converted to a probability that the two pixels belong to the same segment and measure the quality of the embedding by the cross-entropy loss between the actual predictions for pixel pairs, and the ground-truth I/O probabilities for these pixel pairs. The pairs may be sampled both from the same segments, and from different ones.

As another example, the embedding generator 118 may comprise a network based on a U-net backbone that was trained with a loss function that tries to have the embeddings of pixels in different key-value units far apart, and those of pixels in the same key-value unit close together. Notably, this loss function formulation is quite similar to the loss function of the first example, though the two loss formulations are not identical.

In some embodiments, the embedding generator 118 may utilize convolutions via multiple filters at several different scales (e.g., 3×3 pixels, 5×5 pixels, etc.) and, e.g., implement linear combinations of these to generate the embeddings 122. For example, the embedding generator 118 might take a window (of size 3×3 pixels), run the window across the image, and do a convolution with this image portion, resulting in an embedding.

In some embodiments, the embedding generator 118 analyzes convolutions at multiple filters at several scales, concatenates them, and performs a linear combination of the results, resulting in the embeddings. The multiples scales (e.g., 2×2, 3×3, 5×5) may be used to allow for a large enough scale (or bigger box) to be used that is able "see" the area surrounding the immediate pixel—as a "correct" size may not be determinable, embodiments utilize multiple scales by weighting them with weights that are being learned, allowing the embedding generator 118 to adapt to the actual scales seen in the training run. In some embodiments, each per-pixel embedding may be a vector of multiple values, e.g., a 15-number vector.

The electronic document 110 may also be operated upon by a key-value differentiation unit 116 (e.g., partially or completely in parallel with the embedding generator 118 or at a different time) to identify locations 124 of keys and values from the electronic document 110, and optionally the actual keys and values themselves. Further detail regarding the functionality and architecture of the key-value differentiation unit 116 will be presented later herein with regard to FIG. 2. However, the key-value differentiation unit 116 may output identifiers of the locations 124 of keys and values (e.g., coordinates), or individual portions of the electronic document 110 that include the keys or values, etc.

The per-pixel embeddings 122 and locations 124 of keys and value (or portions of the keys and values), optionally along with the original electronic document 110 or image version 130 thereof, are provided to the key-value association unit 119 (e.g., via a queue, via a shared storage location, within a request message or function call, etc.).

At circle (3), a graph constructor 132 may use this information to construct a graph 126. The graph 126 may be a weighted bipartite graph with a first set of nodes corresponding to the keys, and a second set of nodes corresponding to the values. Each node from the first set of nodes (representing the keys) may include an edge to each of the second set of nodes (representing the values). Each such edge has a corresponding weight that is determined by the graph constructor 132 based on the per-pixel embeddings 122.

To determine a weight, between a "key" node and an "edge" node, a pixel from the region of the key (e.g., some sort of center or edge pixel) is identified and a pixel from the region of the value is identified. Conceptually, a line can be stretched between these pixels, and the line can be "traced" to identify an "edge" in the embeddings where there is a large "jump" in the distance between two "neighboring" (e.g., one pixel away, two pixels away, three pixels away, etc.) embeddings—in this case when a large jump is found, it is likely that the key and the value are not of the same key-value unit. For example, the line can be traced at an interval of some number of pixels (e.g., 3 pixels), and the distance between each pairing of two embeddings can be determined using one of a variety of types of distance measure formulations known to those of skill in the art. The overall edge weight may be based on these distances—e.g., a maximum distance value found may be used as the edge's weight.

Alternatively, in some embodiments (perhaps when the embedding generator 118 employs the network described above based on a U-net backbone or similar) the edge weight may simply be set as the distance between an average embedding from each of the two regions (i.e., the region or polygon/bounding box encompassing the key, and the region or polygon/bounding box encompassing the value).

With the constructed bipartite graph 126 with edge weights, at circle (4) a pairing unit 134 may "pair" up ones of the keys with one of the values based on a graph analysis solving an association problem. For example, in some embodiments the pairing unit 134 may partition the graph to identify pairs of the keys with the values that results in an overall minimum edge cost.

Alternatively, a greedy approach could be employed, e.g., to pair the two nodes with an overall lowest edge weight, remove those nodes and edges from the graph (or from further consideration), and then pair a next two nodes with a next minimal edge weight, and so on. However, although this approach is sufficient in many scenarios, the overall results in some cases may be better using a non-greedy overall graph analysis described above, which optimizes for a minimum overall distance for the graph.

At this point, the key-value association unit 119, has a set of all keys with their associated values, and this information may be used in a variety of ways—e.g., represented in JavaScript Object Notation (JSON) format and sent back to a client device 104, stored at some storage location, etc.

Figure 2:
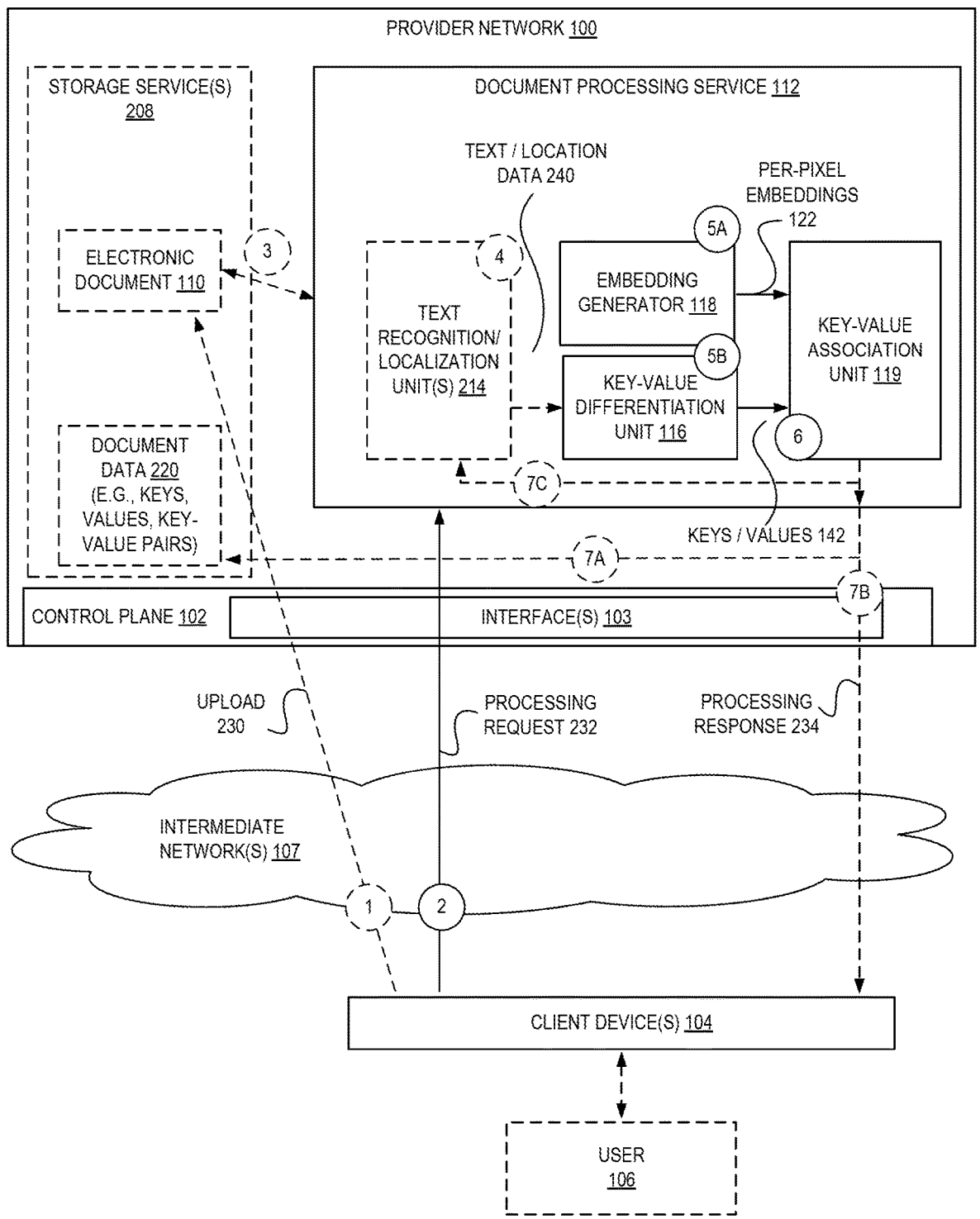
FIG. 2 is a diagram illustrating an environment including a document processing service of a provider network for automated form understanding via layout-agnostic identification of keys and corresponding values according to some embodiments.

For further detail on the usage of the key-value association unit 119 and embedding generator 118 along with other components to form a portion of a document processing service 112, we turn to FIG. 2, which is a diagram illustrating an environment including a document processing service of a provider network for automated form understanding via layout-agnostic identification of keys and corresponding values according to some embodiments.

To utilize the document processing service 112, a user 106 may utilize a client device 104 to obtain (e.g., create, download, capture via a camera/optical sensor, etc.) an electronic document 110. The electronic document 110 may be a digital file storing a representation of a document such as a form. For example, the electronic document 110 may be a Portable Document Format (PDF) file, a word processing document such as a Word™ document or Open Document Format (ODF) file, an image including a representation of a document (e.g., a JPG, GIF, PNG), etc.

Optionally, the user 106 may upload 230 the electronic document 110 (e.g., a digital image) to a location that is distinct from the document processing service 112 at circle (1). For example, the user 106 may cause the electronic device 104 to send the electronic document 110 to be stored at a location of a storage service 208 within (or alternatively, outside of) the provider network 100. The storage service 208 may provide, in a non-illustrated response message, an identifier of the electronic document 110 (e.g., a Uniform Resource Locator (URL) for the file, a unique identifier of the file within the context of the storage service 208 or provider network 100, a name of a folder (or storage "bucket" or group) that includes the file, etc.

At circle (2), the user 106 may utilize a client device 104 to cause it to send a processing request 232 to the document processing service 112. The processing request 232 may indicate the user's desire for the document processing service 112 to process a particular electronic document 110 (or group of electronic documents) in some particular manner.

For example, the processing request 232 may indicate that text of a form represented within the electronic document(s) 110 is to be identified, and that text "values" corresponding to text "keys" within the form are to be identified and paired, stored, and/or processed in some manner. As one example, an electronic document 110 may comprise an image file that was captured by an optical sensor of a scanner device or a user's mobile device, where the image file is a picture of a form such as a government-issued form document (e.g., a W2 form, a tax return form, etc.), a form provided by a company (e.g., a product order form, an employment application, etc.), or other type of form. Thus, the processing request 232 may indicate a request to identify data values entered within the form—e.g., a number (the value) of years of experience (the key) entered into an employment application—and store those values (e.g., within a database, which may have columns/keys corresponding to form keys), process those values (e.g., using a special purpose script, application, or set of rules), etc.

The processing request 232 may include (or "carry") the electronic document 110 or may include an identifier of an electronic document 110 (e.g., a URL). In a use-case where the processing request 232 includes the electronic document 110, the document processing service 112 may optionally at circle (3) store the electronic document 110 via a storage service 208. In a use-case where the processing request 232 identifies the electronic document 110, the document processing service 112 may obtain the electronic document 110 at circle (3) based on the identifier (e.g., by sending a HyperText Transfer Protocol (HTTP) GET request destined to a provided URL).

To process the electronic document 110, optionally a set of pre-processing operations may be performed—e.g., verify that a page/form is present in the image, determine whether the image needs to be rotated, rectify the page, clean up noise, adjust coloring, contrast, or the like, determine if the image is of sufficient quality (in terms of resolution, occlusions, contrast), etc.

At circle (4) the text recognition/localization unit 214 may operate upon the electronic document 110 to identify locations of text within the document. The text recognition/localization unit 214 may comprise, for example, an object detection ML model trained to identify locations of characters, words, lines of text, paragraphs, etc., as is known to those of skill in the art. The text recognition/localization unit 214 can identify the locations of the text in the form of bounding boxes, coordinates, etc.

Optionally, the text recognition/localization unit 214 can also identify the text itself within the electronic document 110. This identification may include using the identified locations of text e.g., by performing an optical character recognition (OCR) process upon portions of the electronic document 110 identified by these locations. Thus, this OCR procedure may be run against a subset of the document (in the form of the identified locations) and not against the entire document itself, which can be faster, more resource efficient, and eliminate or reduce the analysis of other non-necessary text that may be within the document (e.g., instructions, footnotes). In some embodiments, such text identification occurs before the operations described with regard to circles (5A), (5B), and/or (6), though in other embodiments it occurs in parallel with ones of these operations, or even after these operations have completed. For example, after key regions and associated value regions have been identified (e.g., after circle (6)), key-value association unit 119 may trigger (directly via a request message or function call, or indirectly via another intermediary unit) the text recognition/localization unit 214 to identify what the text is within the key regions and value regions. Alternatively, the text recognition/localization unit 214 may simply perform an OCR process that may not include a separate location detection phase.

However, in some embodiments the text recognition/localization unit 214 may utilize different techniques to achieve the same result. For example, the electronic document 110 may potentially be a PDF file already including the text within the document (instead of just carrying a "flat" image alone), and the text recognition/localization unit 214 may identify this text and also identify the locations of that text (e.g., from the PDF metadata, from its own object detection or matching model, etc.).

At this stage, text has been detected as being represented within the electronic document 110, and locations of the text have similarly been detected. However, when the electronic document 110 is a form—and especially a "new" form that has not yet been observed—there is no knowledge of which text elements are "keys" of the form and which are "values." As is known, a form may include one or more keys such as "first name," "last name," "full name," "address," "amount," "value," etc., and the completed form may have values for one or more (or possibly all) of these keys—e.g., "Dominic," "200.50," "Samuel," etc. To be able to act upon this data in a programmatic and intelligent way, it is imperative to determine which text elements are keys and which are values.

The detected text elements and/or location data 240 are provided to the key-value differentiation unit 116, which can operate on portions (or all) of the electronic document 110 at circle (5B) with this provided information to determine which of the text elements are keys and which of the text elements are values. The detected text elements and location data 240 may be provided by sending this data (e.g., within files, or within a "string" or "blob" of text) directly to the key-value differentiation unit 116, by storing this data in a known storage location (e.g., by storage service 208) that the key-value differentiation unit 116 is configured to look in, by sending an identifier of such a location to the key-value differentiation unit 116, etc. Similarly, the electronic document 110 itself may be passed according to similar techniques together with or separate from the detected text elements and location data 240.

The key-value differentiation unit 116 operates by generating a feature vector for each text element (e.g., word or phrase) using one or more specially-trained machine learning (ML) models. The feature vectors created for each text element of a particular electronic document 110 are clustered into (at least) two different groups. The key-value differentiation unit 116 can then use labeled feature vectors (indicating whether corresponding text elements are keys or values) to determine which cluster includes feature vectors corresponding to "key" text elements and/or "value" text elements. The labeled feature vectors may have been provided/used during the training of the ML model(s), could be "actual" keys and values previously determined by the key-value differentiation unit 116 (and confirmed as being accurately detected), or a combination of both.

For example, according to some embodiments, a key-value differentiation unit 116 can identify which words or phrases of an electronic document are key fields and which words or phrases are key values. The key-value differentiation unit generates feature vectors for detected text elements from a document using a ML model that was trained to cause feature vectors for key fields to be separated from key values, feature vectors for key fields to be close to those of other key fields, and feature vectors for values to be close to those of other values. The feature vectors are clustered into two clusters. For values of each cluster, neighbors (e.g., nearest neighbors) can be identified from a labeled set of feature vectors, and based on the labels of the neighbors from each cluster, the identity of each cluster is determined.

When the text elements that are keys and/or the text elements that are values (or "keys/values 142") are determined, the keys/values 142 may be provided to the key-value association unit 119 and processed at circle (6) as described above. Additionally, at circle (5A) the embedding generator 118 may similarly operate on the electronic document 110 to generate per-pixel embeddings as described above, which are also provided to the key-value association unit 119 and processed at circle (6) as described above.

At this point, the key-value association unit 119 generates an output identifying which keys are associated with which values. This data may be stored via one or more storage services 208 as document data 220 at optional circle (7A). As one example, a representation of the keys and values may be generated (e.g., in JSON or eXtensible Markup Language (XML) format, as a string or blob of text, etc.) and stored as a file or as a database entry (or set of entries).

The output may be of a variety of formats. For example, for a value, the output may be a text string or a number, an indicator (e.g., CHECKED/UNCHECKED, TRUE/FALSE, etc.) indicating whether a checkbox (or other user interface input element) is marked, an image crop (e.g., a signature field), etc.

Additionally, or alternatively, at optional circle (7B) the data may be provided to an external (to the provider network 100) destination such as a client device 104 of the user 106, possibly within a processing response message 234, which may or may not be responsive to the processing request 232. For example, the processing response message 234 may be sent as part of a session of communication where the user 106 utilizes a client device 104 to interact with the document processing service 112 via a web application (and thus, via a web endpoint interface 103) or another application.

As another example, in some embodiments the actual text may not have been yet identified (e.g., such as when the text recognition/localization unit(s) 214 have detected regions/locations including the text, but not the actual text itself), and thus at circle (7C) the key-value association unit 119 may cause the text recognition/localization unit(s) 214 to identify the actual text of the keys and values. For example, the key-value association unit 119 may send a request to the text recognition/localization unit(s) 214 that includes (or identifies) the particular regions of interest to be analyzed for text recognition. The resulting text could be returned to the key-value association unit 119, stored as document data 220, sent back within processing response 234, etc., depending on the particular embodiment.

Although these exemplary functions and units 214/116/119 are described as being utilized in a serial or sequential manner, in various embodiments these functions may be implemented in other ways known to those of skill in the art with the benefit of this disclosure. For example, in some embodiments the key-value association unit 119 may operate partially or completely in parallel with other processing units—e.g., the key-value differentiation unit 116. In other embodiments, the key-value association unit 119 and key-value differentiation unit 116 may be implemented as a combined unit and possibly benefit from the existence of common processing tasks needed by each thus needing to only be performed once. Thus, many variations of these techniques and implementations exist which are covered by various embodiments.

For further detail, FIG. 3 is a diagram illustrating an exemplary loss function 300 useful for training one or more machine learning models of the embedding generator according to some embodiments. In some embodiments, the distance between the embedding vectors is converted to a probability that the two pixels belong to the same segment, and the quality of the embedding is measured by the cross-entropy loss between the actual predictions for pixel pairs, and the ground-truth I/O probabilities for these pixel pairs. The pairs are sampled both from the same segments, and from different ones.

Thus, in some embodiments, the network is trained by minimizing the following loss 300 shown, where S is the set of pixels that we choose, $y_p$ is the instance label of pixel p, and $w_{pq}$ is the weight of the loss on the similarity between p and q. The weights $w_{pq}$ are set to values inversely proportional to the size of the instances p and q belong to, so the loss will not become biased towards the larger examples. The weights may be normalized so that $\Sigma_{p,q} w_{pq}=1$.

Figure 4:
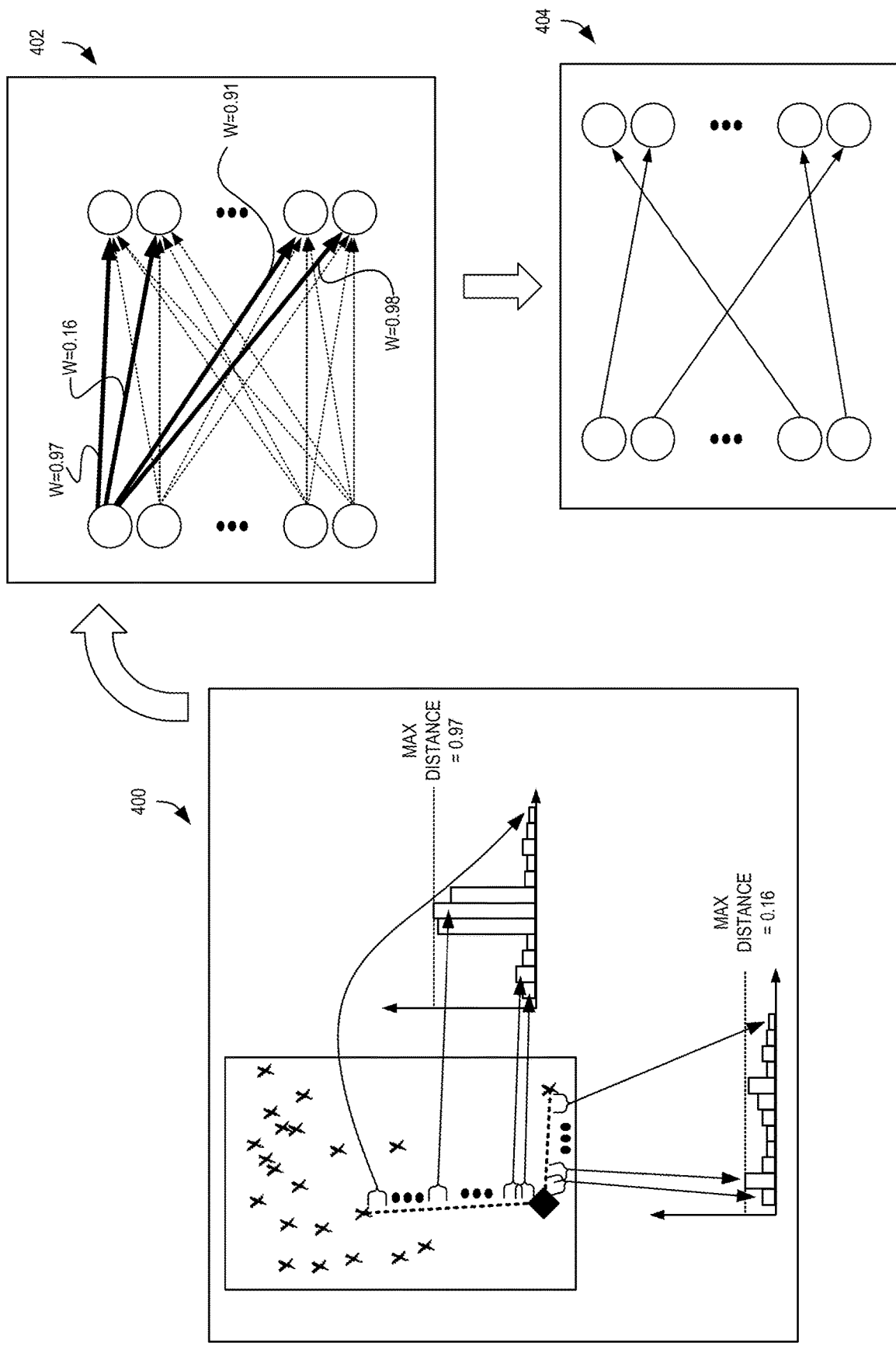
FIG. 4 is a diagram illustrating exemplary edge weight determination, graph construction, and graph partitioning operations used for automated form understanding via layout-agnostic identification of keys and corresponding values according to some embodiments.

For further clarity of understanding, FIG. 4 is a diagram illustrating exemplary edge weight determination, graph construction, and graph partitioning operations used for automated form understanding via layout-agnostic identification of keys and corresponding values according to some embodiments. As shown at 400, a center pixel of one "key" node is represented as being a black diamond and center pixels of all of the "value" nodes are represented as "X" marks. In this example, two dotted lines are illustrated connecting a center point of the key with two different values. Distances calculated based on three-pixel windows from the horizontal line are shown on the graph on the bottom. In this example, distances are real values between 0.0 (indicating a high likelihood of the pixels being in a same key-value unit) and 1.0 (indicating a low likelihood of the pixels being in a same key-value unit). As shown in the graph on the bottom, a largest (or maximum) distance is identified as 0.16.

Similarly, the vertical dotted line is also walked in three-pixel windows and the distances between these embeddings is shown in the graph on the right side. In this case, a large "edge" is detected in approximately the middle of the line, which likely corresponds to a border between different key-value units. Thus, in this case a maximum distance is identified as 0.97. This process can repeat between the key pixel and all the other "center" value pixels, and the maximum distances can be used to create weights for edges in a graph that is constructed as shown at 402. In this example, the bipartite graph includes a column on the left for the keys, each of which is connected to each of the nodes in the column on the right representing values. Each edge comprises a weight value, e.g., the maximum distance found on the line between the corresponding center points at 400. In this example, only a few weights for one of the key nodes is shown for simplicity of illustration and understanding—here, 0.97, 0.16, 0.91, and 0.98—though there may be more or fewer edges for each key node, and there may be more or fewer key or value nodes in different scenarios depending on the number of keys and values that were identified in the document.

At 404, the graph can be partitioned such that every key node is connected zero or one value nodes. This may include the use of a non-greedy optimization algorithm to find an overall partition resulting in a minimum total edge weight, a greedy algorithm that selects the smallest edge weights first and continues on, etc.

In some embodiments, an edge will only be selected and used to associate a key and a value if the edge weight is less than a particular threshold distance/weight, which may allow for no value to be associated with a key, which often happens if a value field in the form is blank.

Figure 5:
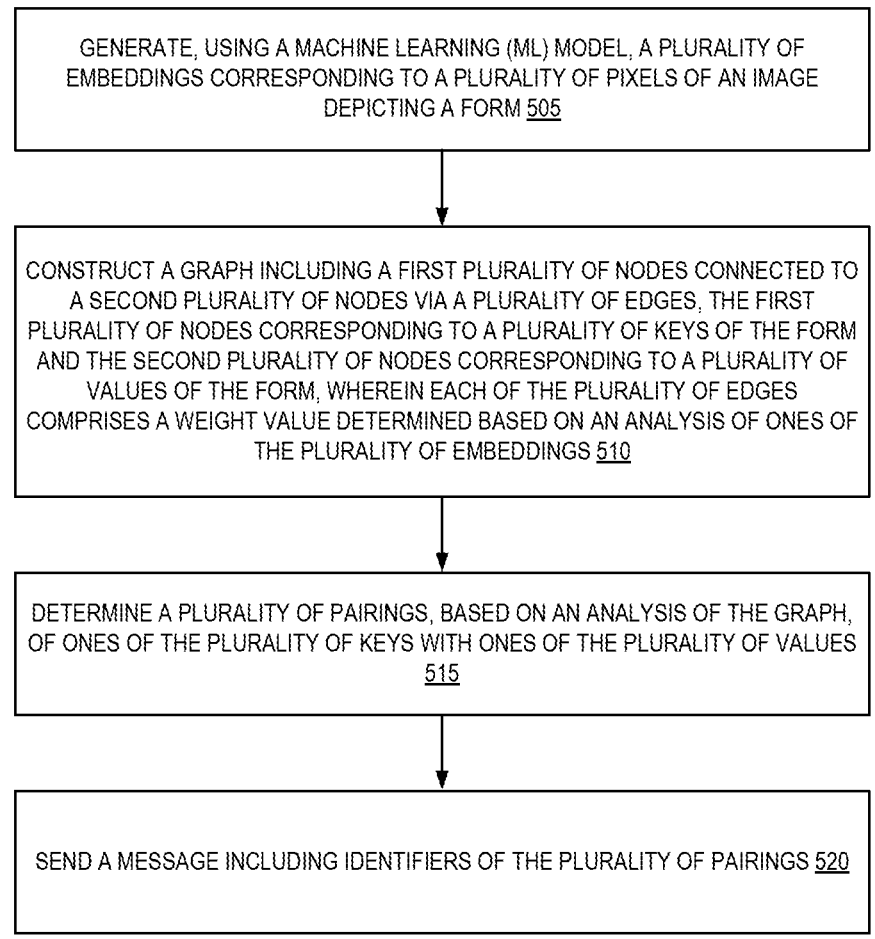
FIG. 5 is a flow diagram illustrating exemplary operations of a method for automated form understanding via layout-agnostic identification of keys and corresponding values according to some embodiments.

FIG. 5 is a flow diagram illustrating exemplary operations of a method for automated form understanding via layout-agnostic identification of keys and corresponding values according to some embodiments.

Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the embedding generator 118 or key-value association unit 119 of the other figures.

The operations 500 include, at block 505, generating, using a machine learning (ML) model, a plurality of embeddings corresponding to a plurality of pixels of an image depicting a form. In some embodiments, block 505 may be performed by the embedding generator 118.

In some embodiments, the ML model was trained according to a loss function that separates embeddings of pixels in a same key-value unit of the image from embeddings of pixels in another key-value unit of the image. In some embodiments, each key-value unit comprises a region from the image including a key and a location for a value corresponding to the key.

The operations 500 include, at block 510, constructing a graph including a first plurality of nodes connected to a second plurality of nodes via a plurality of edges, the first plurality of nodes corresponding to a plurality of keys of the form and the second plurality of nodes corresponding to a plurality of values of the form, wherein each of the plurality of edges comprises a weight value determined based on an analysis of ones of the plurality of embeddings. In some embodiments, block 510 may be performed by the key-value association unit 119, e.g., the graph constructor 132 component.

According to some embodiments, each of the first plurality of nodes is connected to each of the second plurality of nodes, wherein each of the first plurality of nodes corresponds to a key within the image and each of the second plurality of nodes corresponds to a value within the image In some embodiments, generating the graph comprises, for a first of the plurality of edges that connects a first node with a second node: identifying a first representative pixel from a first region corresponding to a first key corresponding to the first node; identifying a second representative pixel from a second region corresponding to a first value corresponding to the second node; and determining a plurality of distance values between ones of the plurality of embeddings lying between a first embedding corresponding to the first representative pixel and a second embedding corresponding to the second representative pixel. In some embodiments, generating the graph further comprises, for the first of the plurality of edges that connects a first node with a second node: selecting, as the weight value for the first edge, a maximum distance value of the plurality of distance values.

At block 515, the operations 500 further include determining a plurality of pairings, based on an analysis of the graph, of ones of the plurality of keys with ones of the plurality of values. In some embodiments, block 510 may be performed by the key-value association unit 119, e.g., the pairing unit 134 component. According to some embodiments, determining the plurality of pairings comprises determining a partitioning of the graph into the plurality of pairings that has a minimum overall weight value of remaining edges.

The operations 500 include, at block 520, sending a message including identifiers of the plurality of pairings. In some embodiments, block 510 may be performed by the key-value association unit 119 or one or more interfaces 103 of a provider network 100. The message may be sent to a client device of a user that requested an analysis of the form, and the identifiers of the plurality of pairings may be sent, for example, as JSON or XML formatted text that specifies the text of the keys and values, and which of the keys are associated with which of the values, if any. The message may alternatively or additionally be sent to a storage service (e.g., within a same provider network as the entity performing block 520) to cause the identifiers of the plurality of pairings, which may optionally thereafter be downloaded by a client device (or another application) of a user that requested an analysis of the form. The message may alternatively be sent to a text recognition/localization unit 214 that may use the identifiers (e.g., bounding boxes or polygons, coordinates, etc.) to identify the text corresponding to these regions.

In some embodiments, the operations 500 may also include receiving, at a web service endpoint of a provider network, a request to process the image, the request including the image or identifying a location of the image, wherein the message sent that includes the identifiers of the plurality of pairings is destined to a client device outside of the provider network.

In some embodiments, the ML model was trained using a plurality of pairs of pixels; one or more of the plurality of pairs includes two pixels located within a same key-value unit; and another one or more of the plurality of pairs includes two pixels located in different key-value units. In some embodiments, the ML model comprises a convolutional neural network, and in some embodiments the ML model, to generate each of the plurality of embeddings, performs convolutions via multiple filters at several different scales.

Figure 6:
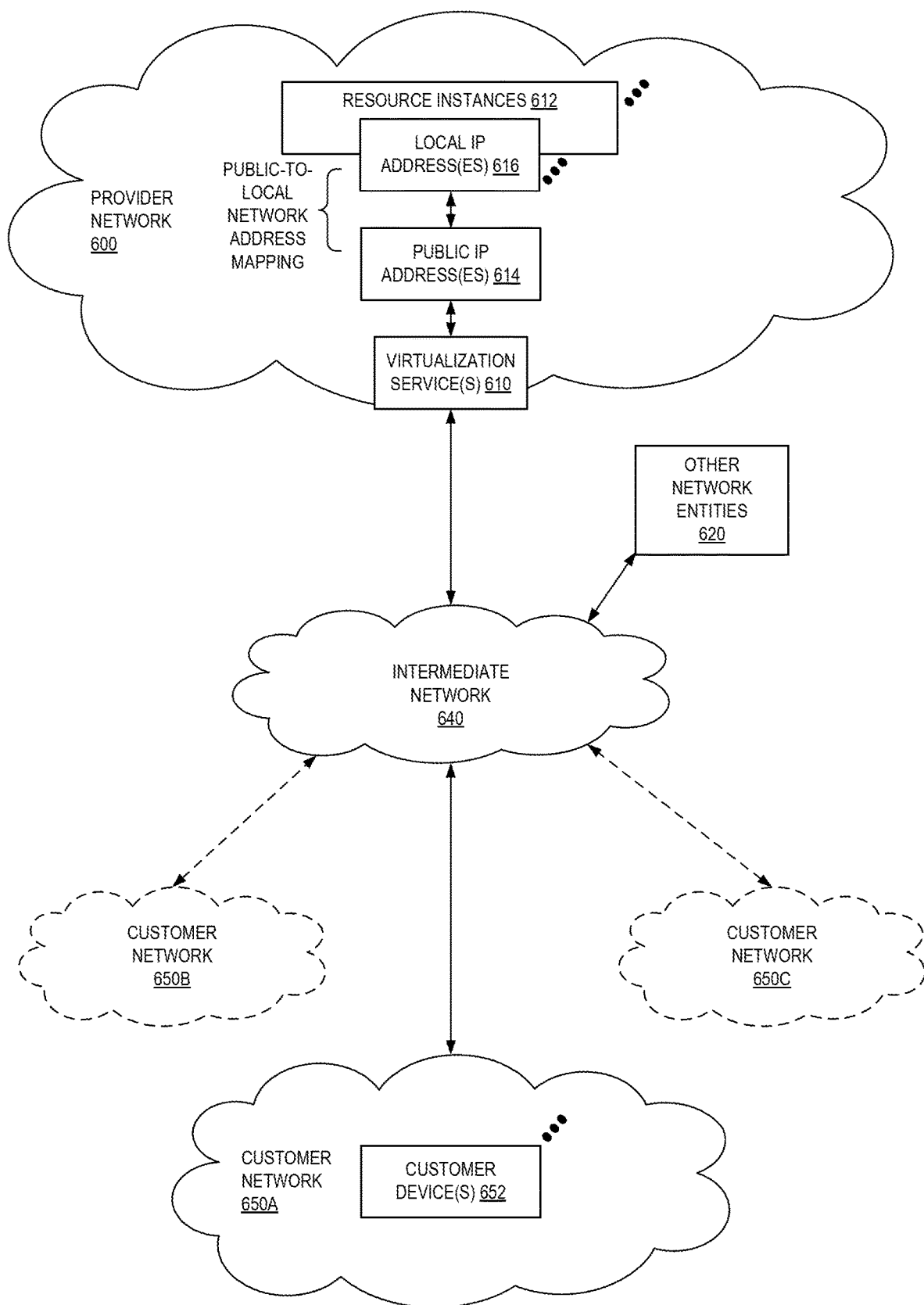
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
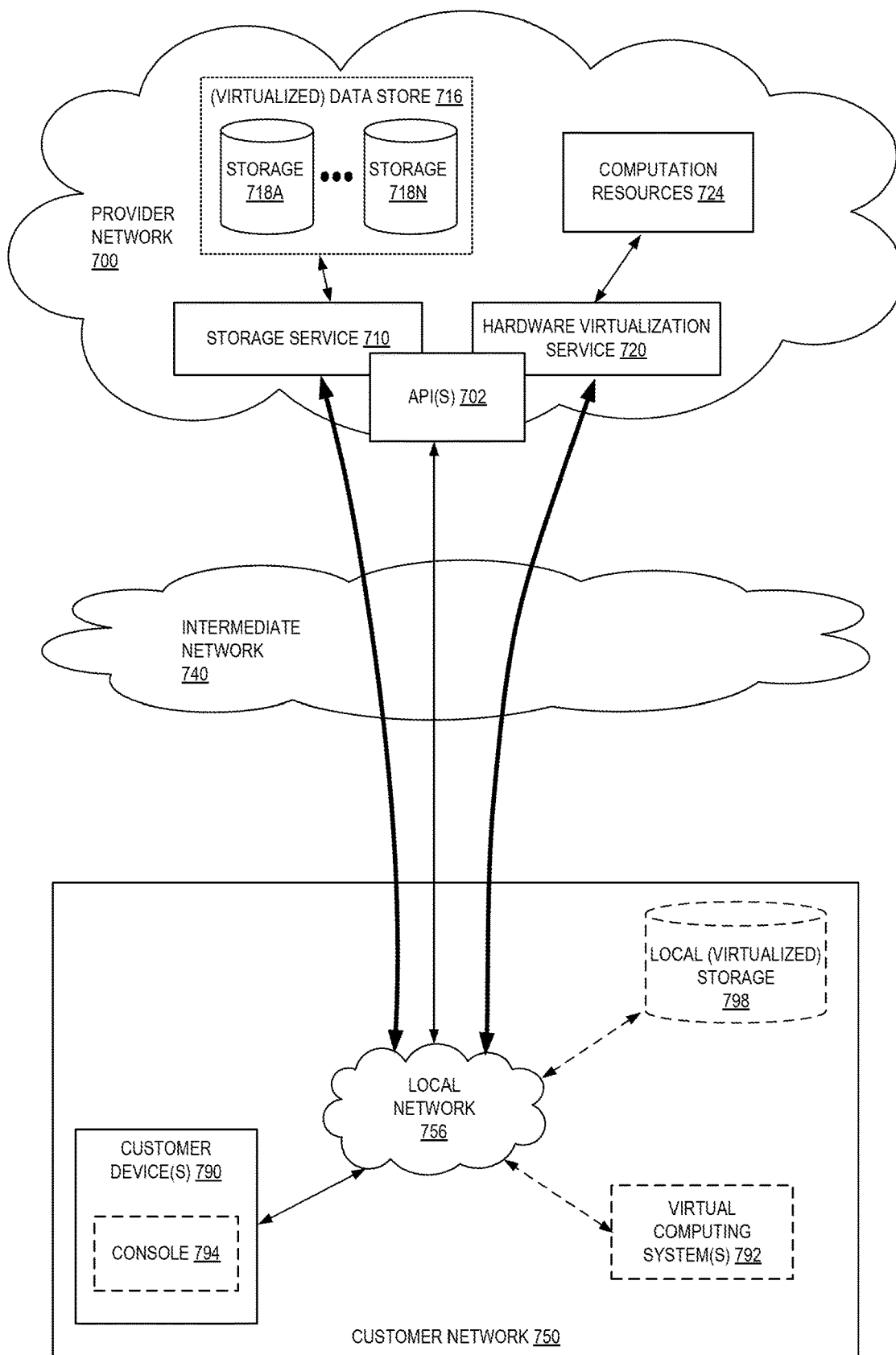
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
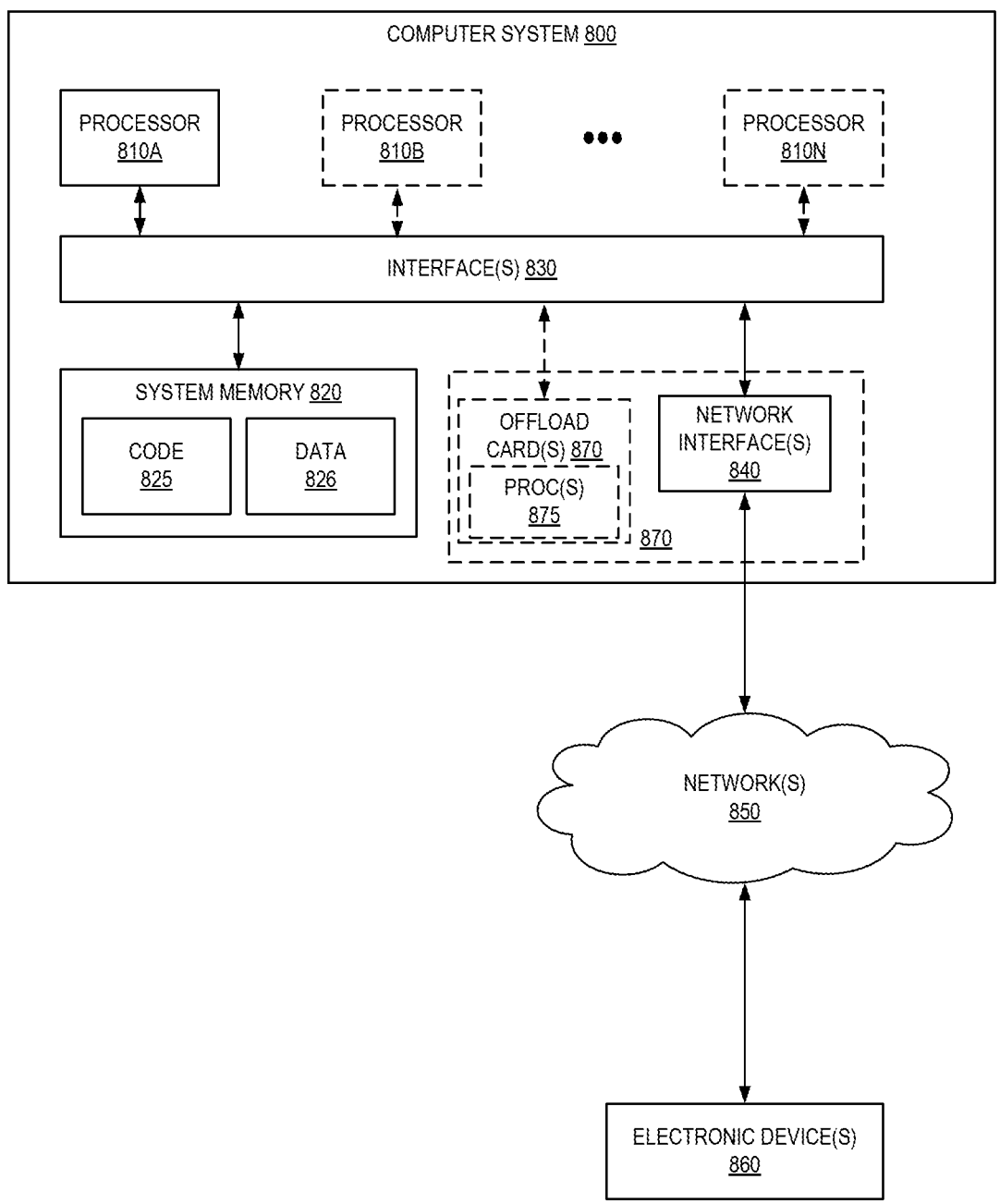
FIG. 8 is a block diagram illustrating an example computer system that may be used in some embodiments.

In some embodiments, a system that implements a portion or all of the techniques for automated form understanding via layout-agnostic identification of keys and corresponding values as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
obtaining an electronic image comprising a visual representation of a form;
generating, using a machine learning (ML) model, a plurality of embeddings corresponding to a plurality of pixels of the electronic image, wherein the ML model was trained according to a loss function that separates embeddings of pixels in a same key-value unit from embeddings of pixels in other key-value units;

constructing a weighted bipartite graph including a first plurality of nodes connected to a second plurality of nodes via a plurality of edges, wherein each of the first plurality of nodes is connected to each of the second plurality of nodes, wherein each of the first plurality of nodes corresponds to a key within the electronic image and each of the second plurality of nodes corresponds to a value within the electronic image, and wherein a weight of each of the plurality of edges is based on an analysis of a set of the plurality of embeddings;

performing a combinatorial optimization process using the weighted bipartite graph to determine a plurality of pairings of ones of the plurality of keys with ones of the plurality of values; and sending a message including identifiers of the plurality of pairings or storing the identifiers of the plurality of pairings.

2. The computer-implemented method of claim 1, wherein constructing the weighted bipartite graph comprises:

determining the weight for a first edge in the weighted bipartite graph between a first node of the first plurality of nodes and a second node of the second plurality of nodes, the determining including:

generating a plurality of distance values between embeddings that lie on a line between a first embedding and a second embedding, the first embedding corresponding to a first pixel of the electronic image associated with a first key, the second embedding corresponding to a second pixel of the electronic image associated with a first value, and selecting, as the weight, a maximum distance value of the plurality of distance values.

3. The computer-implemented method of claim 1, wherein the combinatorial optimization process comprises identifying the plurality of pairings that produces a minimum overall graph edge weight.

4. A computer-implemented method comprising:

generating, using a machine learning (ML) model, a plurality of embeddings corresponding to a plurality of pixels of an image depicting a form;

constructing a graph including a first plurality of nodes connected to a second plurality of nodes via a plurality of edges, the first plurality of nodes corresponding to a plurality of keys of the form and the second plurality of nodes corresponding to a plurality of values of the form, wherein each of the plurality of edges comprises a weight value determined based on an analysis of ones of the plurality of embeddings;

determining a plurality of pairings, based on an analysis of the graph, of ones of the plurality of keys with ones of the plurality of values; and sending a message including identifiers of the plurality of pairings.

5. The computer-implemented method of claim 4, wherein the ML model was trained according to a loss function that separates embeddings of pixels in a same key-value unit of the image from embeddings of pixels in another key-value unit of the image.

6. The computer-implemented method of claim 5, wherein each key-value unit comprises a region from the image including a key and a location for a value corresponding to the key.

7. The computer-implemented method of claim 4, wherein each of the first plurality of nodes is connected to each of the second plurality of nodes, wherein each of the first plurality of nodes corresponds to a key within the image and each of the second plurality of nodes corresponds to a value within the image.

8. The computer-implemented method of claim 7, wherein determining the plurality of pairings comprises determining a partitioning of the graph into the plurality of pairings that has a minimum overall weight value of remaining edges.

9. The computer-implemented method of claim 4, wherein generating the graph comprises, for a first of the plurality of edges that connects a first node with a second node:

identifying a first representative pixel from a first region corresponding to a first key corresponding to the first node;

identifying a second representative pixel from a second region corresponding to a first value corresponding to the second node; and determining a plurality of distance values between ones of the plurality of embeddings lying between a first embedding corresponding to the first representative pixel and a second embedding corresponding to the second representative pixel.

10. The computer-implemented method of claim 9, wherein generating the graph further comprises, for the first of the plurality of edges that connects a first node with a second node:

selecting, as the weight value for the first edge, a maximum distance value of the plurality of distance values.

11. The computer-implemented method of claim 4, further comprising:

receiving, at a web service endpoint of a provider network, a request to process the image, the request including the image or identifying a location of the image, wherein the message sent that includes the identifiers of the plurality of pairings is destined to a client device outside of the provider network.

12. The computer-implemented method of claim 4, wherein:

the ML model was trained using a plurality of pairs of pixels;

one or more of the plurality of pairs includes two pixels located within a same key-value unit; and another one or more of the plurality of pairs includes two pixels located in different key-value units.

13. The computer-implemented method of claim 12, wherein the ML model comprises a convolutional neural network.

14. The computer-implemented method of claim 13, wherein the ML model, to generate each of the plurality of embeddings, performs convolutions via multiple filters at several different scales.

15. A system comprising:

a storage service implemented by a first one or more electronic devices within a provider network; and a document processing service implemented by a second one or more electronic devices within the provider network, the document processing service including instructions that upon execution cause the document processing service to:

generate, using a machine learning (ML) model, a plurality of embeddings corresponding to a plurality of pixels of an image depicting a form, construct a graph including a first plurality of nodes connected to a second plurality of nodes via a plurality of edges, the first plurality of nodes corresponding to a plurality of keys of the form and the second plurality of nodes corresponding to a plurality of values of the form, wherein each of the plurality of edges comprises a weight value determined based on an analysis of ones of the plurality of embeddings, determine a plurality of pairings, based on an analysis of the graph, of ones of the plurality of keys with ones of the plurality of values, and send a message including identifiers of the plurality of pairings.

16. The system of claim 15, wherein the ML model was trained according to a loss function that separates embeddings of pixels in a same key-value unit of the image from embeddings of pixels in another key-value unit of the image.

17. The system of claim 16, wherein each key-value unit comprises a region from the image including a key and a location for a value corresponding to the key.

18. The system of claim 15, wherein each of the first plurality of nodes is connected to each of the second plurality of nodes, wherein each of the first plurality of nodes corresponds to a key within the image and each of the second plurality of nodes corresponds to a value within the image.

19. The system of claim 18, wherein to determine the plurality of pairings, the instructions upon execution cause the document processing service to:

determine a partitioning of the graph into the plurality of pairings that has a minimum overall weight value of remaining edges.

20. The system of claim 15, wherein to generate the graph the instructions upon execution cause the document processing service to, for a first of the plurality of edges that connects a first node with a second node:

identify a first representative pixel from a first region corresponding to a first key corresponding to the first node;

identify a second representative pixel from a second region corresponding to a first value corresponding to the second node; and determine a plurality of distance values between ones of the plurality of embeddings lying between a first embedding corresponding to the first representative pixel and a second embedding corresponding to the second representative pixel.

21. The system of claim 15, wherein the ML model comprises a convolutional neural network.

* * * * *